United States Patent [19]

Macroglou

[11] Patent Number: 5,560,607
[45] Date of Patent: Oct. 1, 1996

[54] GOLFER'S ALIGNMENT DEVICE

[76] Inventor: Christopher N. Macroglou, 24 Home Ave., Carnegie, Pa. 15106

[21] Appl. No.: 507,998

[22] Filed: Jul. 27, 1995

[51] Int. Cl.$^6$ .................................................. A63B 69/36
[52] U.S. Cl. ........................... 273/210; 473/267; 33/370; 351/45
[58] Field of Search ..................... 273/187.2; 473/210, 473/267; 33/365, 370; 351/45

[56] References Cited

U.S. PATENT DOCUMENTS

| | | | |
|---|---|---|---|
| 1,980,101 | 11/1934 | Schneider | 273/187.2 X |
| 3,156,211 | 11/1964 | Mallory | 273/187.2 |
| 4,307,885 | 12/1981 | Pidcock | 273/187.2 |
| 4,789,159 | 12/1988 | Kane | 273/187.2 |

Primary Examiner—George J. Marlo
Attorney, Agent, or Firm—Bartony Hare & Edson

[57] ABSTRACT

The present invention provides a device for assisting a golfer in achieving proper alignment for a golf stroke in which a golf ball is struck to move towards a target. In one embodiment, the device generally comprises a frame member to be worn by the golfer. An alignment member comprising a planar mirrored surface thereon is hingedly or rotatably attached to the frame member to enable adjustable positioning of the mirrored surface such that a reflection of the target may be viewed by the eye of the golfer closest to the target. The device also preferably comprises a level means attached to a distal end of the alignment member for determining whether the alignment member is being held level with respect to the horizontal plane.

5 Claims, 7 Drawing Sheets

GOLFER'S ALIGNMENT DEVICE

FIELD OF THE INVENTION

The present invention relates to a device for improving a golfer's alignment and stroke, and particularly to a device for assisting the golfer in determining proper alignment during putting.

BACKGROUND OF THE INVENTION

It is widely accepted that proper initial body alignment and initial club face alignment are essential to a consistent and effective putting stroke. Indeed, a number of studies have indicated that improper initial alignment results in subconscious compensation during the putting stroke. For example, golfers that consistently align to the right of the target have been found to compensate for such alignment by developing a "pull" putting stroke that starts the ball rolling to the left of their actual alignment. Thus, poor aim generally results in poor stroke mechanics. See Pelz, D., "The First Fundamental of Putting," *GOLF Magazine*, 146 (June 1995).

In developing proper alignment, for example, it is generally believed that the eyes of the golfer should be directly over the target line or in a plane defined by the ball, target and eyes. Indeed, if the eyes are not positioned over the target line, putts of different lengths will be seen from a different angle.

It is also widely accepted that it is nearly impossible to recognize and develop proper alignment simply by practicing the putting stroke on a practice green. A number of devices have thus been developed to provide feedback to the golfer to allow the golfer to recognize proper alignment. For example, laser alignment aids are available. Such devices, however, are relatively expensive. Less expensive, "putting tracks" are also available but are often cumbersome to use and transport.

It is, therefore, very desirable to develop a device for assisting a golfer to determine proper putting alignment that is inexpensive and easy to use.

SUMMARY OF THE INVENTION

Accordingly, the present invention provides a device for assisting a golfer in achieving proper alignment for a golf stroke in which a golf ball is struck to move towards a target. The present device generally comprises frame member to be worn by the golfer. An alignment member comprising a planar mirrored surface thereon is hingedly or rotatably attached to the frame member to enable adjustable positioning of the mirrored surface such that a reflection of the target may be viewed by the eye of the golfer closest to the target. Preferably, the present device also comprises a level means attached to a distal end of the alignment member for determining whether the alignment member is being held level with respect to the horizontal plane. Preferably, the present device also comprises means for indicating when the eyes of the golfer are aligned directly over the target line defined by the ball and the target.

DETAILED DESCRIPTION OF THE INVENTION

Figure 1:
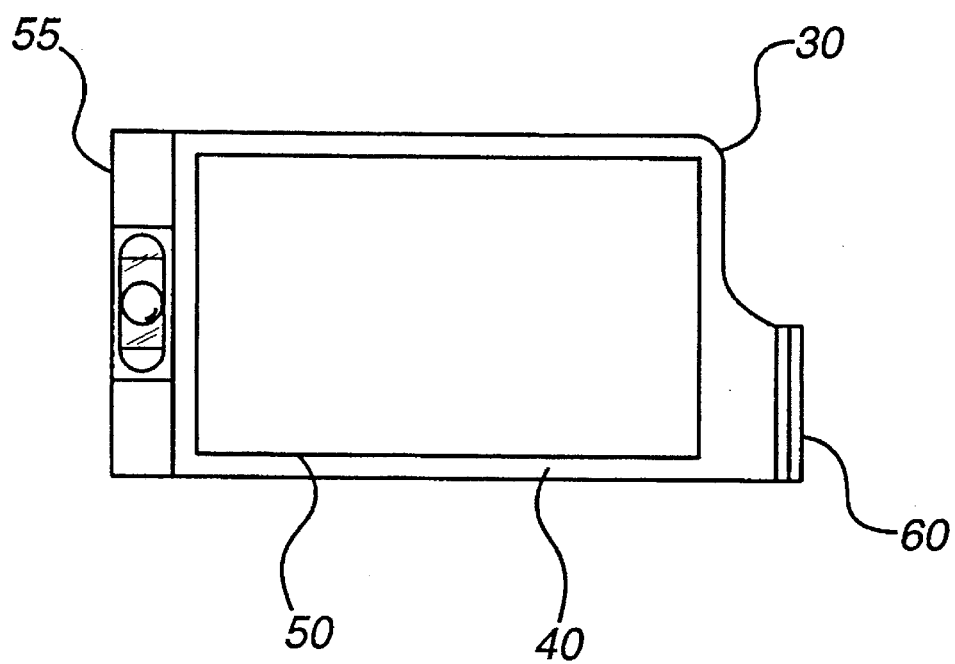
FIG. 1 illustrates a front plan view of an embodiment of the present device.
Figure 2:
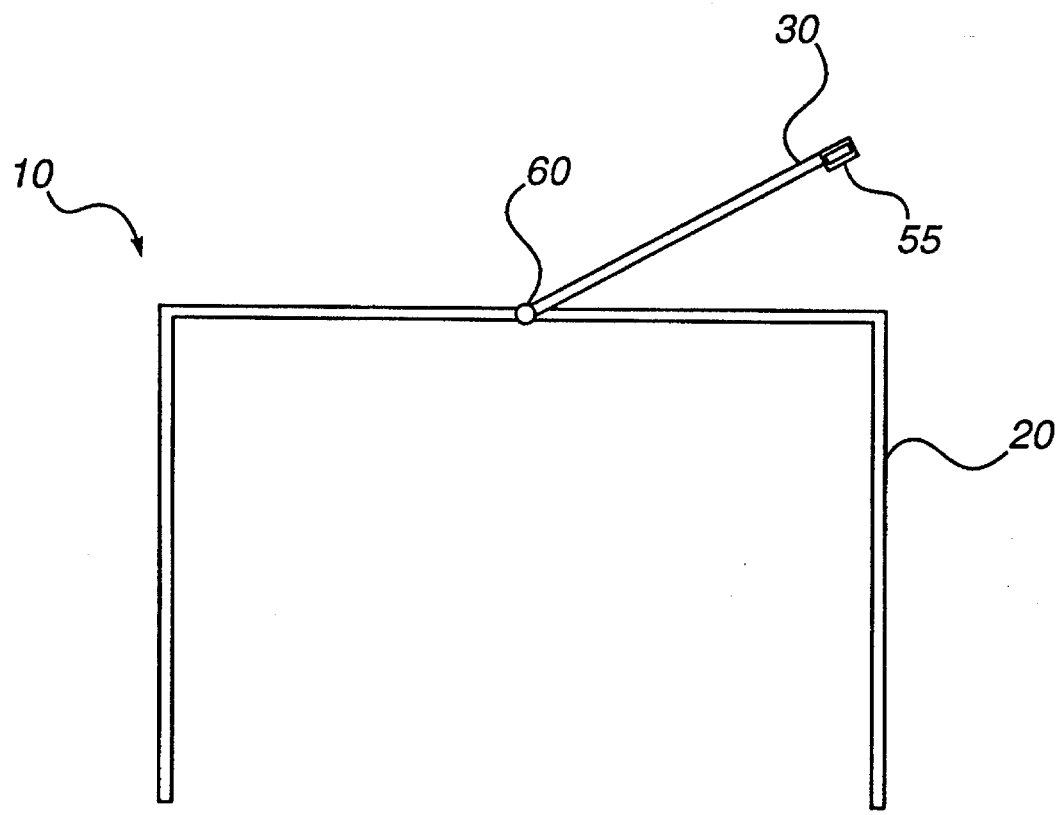
FIG. 2 illustrates a top plan view of the embodiment of FIG. 1.
Figure 3:
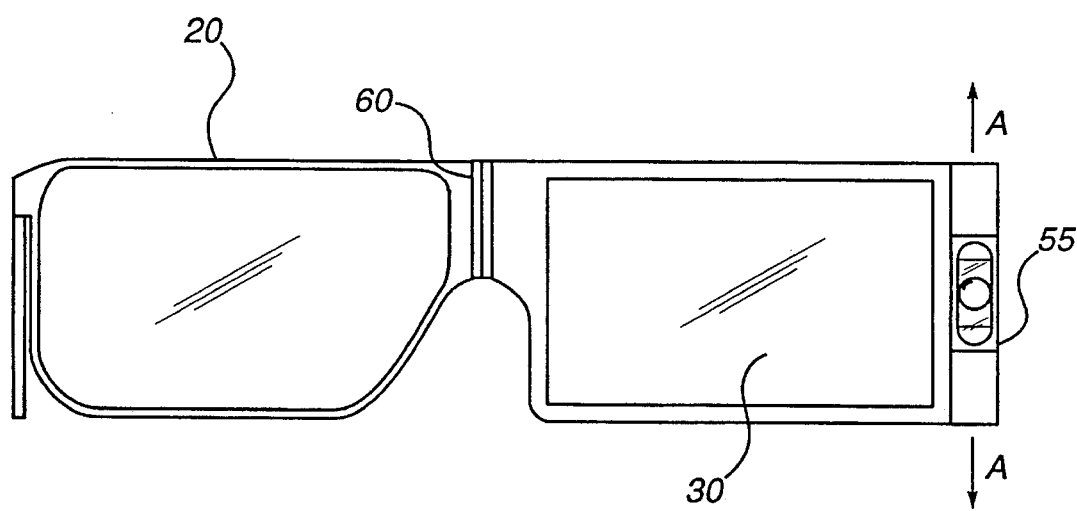
FIG. 3 illustrates an embodiment of an alignment member for use in the present invention.
Figure 4:
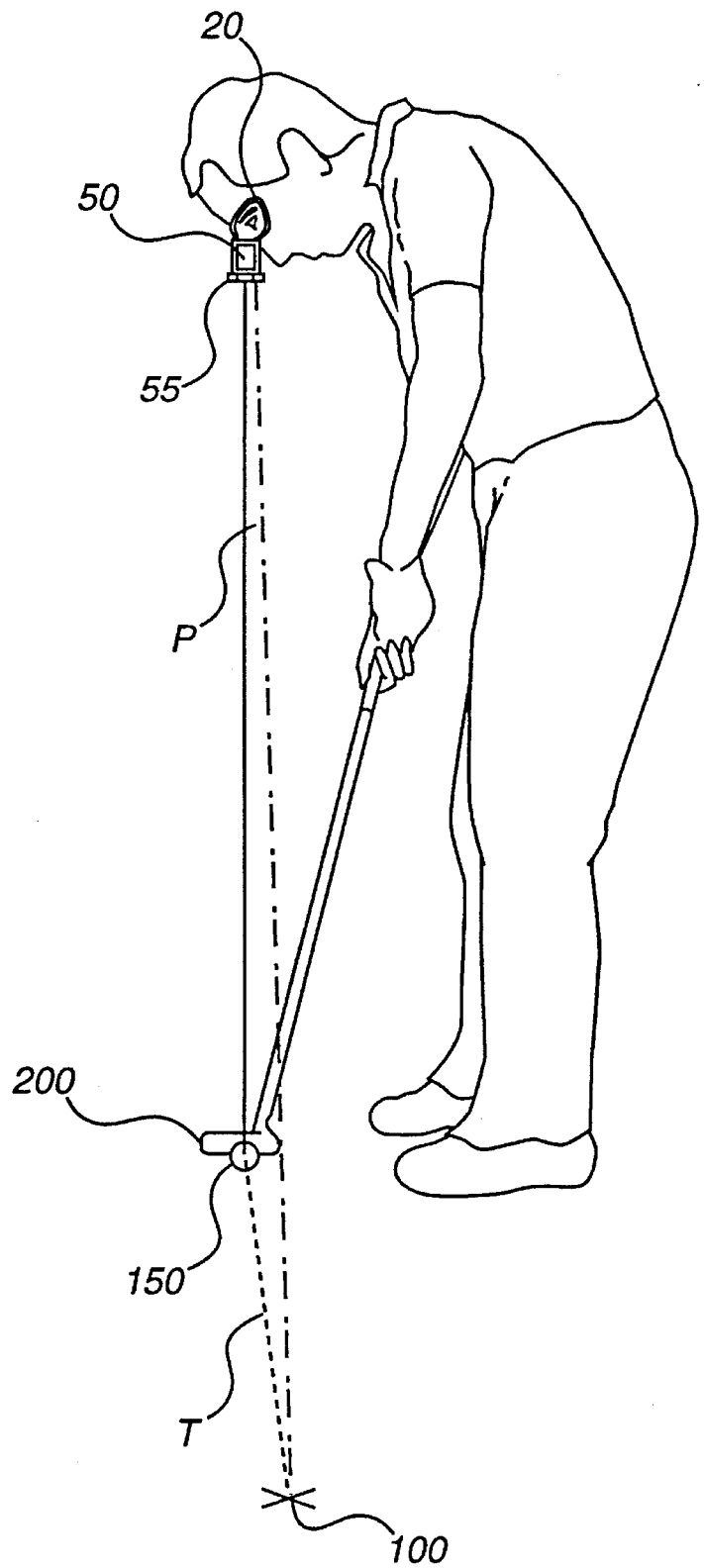
FIG. 4 illustrates the device of FIG. 1 in use by a golfer.

Referring generally FIGS. 1 through 4, the present device 10 preferably comprises a frame member 20 and an alignment member 30 attached to frame member 20. Preferably, frame member 20 comprises eye glass frames as well known in the art. Alternatively alignment member 30 can be attachable via "clip-on" mechanisms well known in the art to the eye glasses of the user. Alignment member 30 comprises a planar member 40, having a mirrored surface 50 thereon.

Alignment member 30 also comprises a means for indicating if the base of alignment member 30 is held level with respect to a horizontal plane. Preferably such indicating means comprises a bubble level 55 as commonly used in carpentry arts. As clear to one of ordinary skill in the art, however, any appropriately sized level means (including, for example, mercury levels) are well suited for use in the present invention. Alignment member 30 is preferably rotatably attached to frame member 20 via hinge 60 at the bridge of frame member 20.

During use, a golfer wears device 10 as one would wear standard eye glasses. While the golfer is in his or her putting stance, alignment member 30 is rotated downwardly so that a golfer can see the target (for example, the golf hole) reflected in mirrored surface 50 out of the eye on the side towards which alignment member 30 is rotated (that is, the eye closest to the target or hole). The vision of the other eye (that is, the eye furthest from the target or hole) is not obstructed by alignment member 30. The user thus has direct, unobstructed vision of the putter head and ball via the eye furthest from the hole (that is, the right eye for a right-handed golfer and the left eye of a left-handed golfer).

Mirrored surface 50 is maintained (via hinge 60) at an appropriate angle $\theta$ with respect to vertical (see FIG. 4) such that the reflection of target 100 is seen in the field of vision of the eye nearest the hole. The reflection of target 100 is aligned such that it appears to the golfer to be directly behind ball 150 and putter 200 to place the golfer's eyes parallel to target line T between target 100 and ball 150.

Device 10 also preferably comprised means for indicating alignment of the eyes substantially directly over ball 150. For example, bubble level 55 is preferably positioned such that by placing the center of bubble level 55 directly in the line of sight with ball 150, target 100 and putter 200 the golfer will be assured that the golfer's eyes will be part of target plane P.

Because of differing head shapes, the center of bubble level 55 is preferably laterally adjustable (that is, in the direction of arrow A of FIG. 3) with respect to the center of alignment member 30 to facilitate achievement of such alignment. The adjustability may be accomplished, for example, via a linear drive screw mechanism (not shown) . . . For example, the distal ends of bubble level 55 may be threaded to cooperate with an appropriately threaded housing located at one or each lateral side of the bottom end of alignment member 30.

Further, by bending at the waist and tilting the head forward so that bubble level 55 indicates that it is level with respect to the horizontal, the base of mirrored surface 50 will be positioned substantially perpendicular to the target line and the target and ball will appear generally in the center of mirrored surface 50 when the golfer's eyes are in proper alignment with the target. Alignment member 30 may also be adjustably attached to frame member 20 to allow rotation in a plane perpendicular to the target line to facilitate leveling of bubble level 55 without strained flexing and/or tilting by the user. Such rotatable adjustment may be accomplished, for example, using a modified ball joint allowing rotation only in the plane of interest.

Figure 5A:
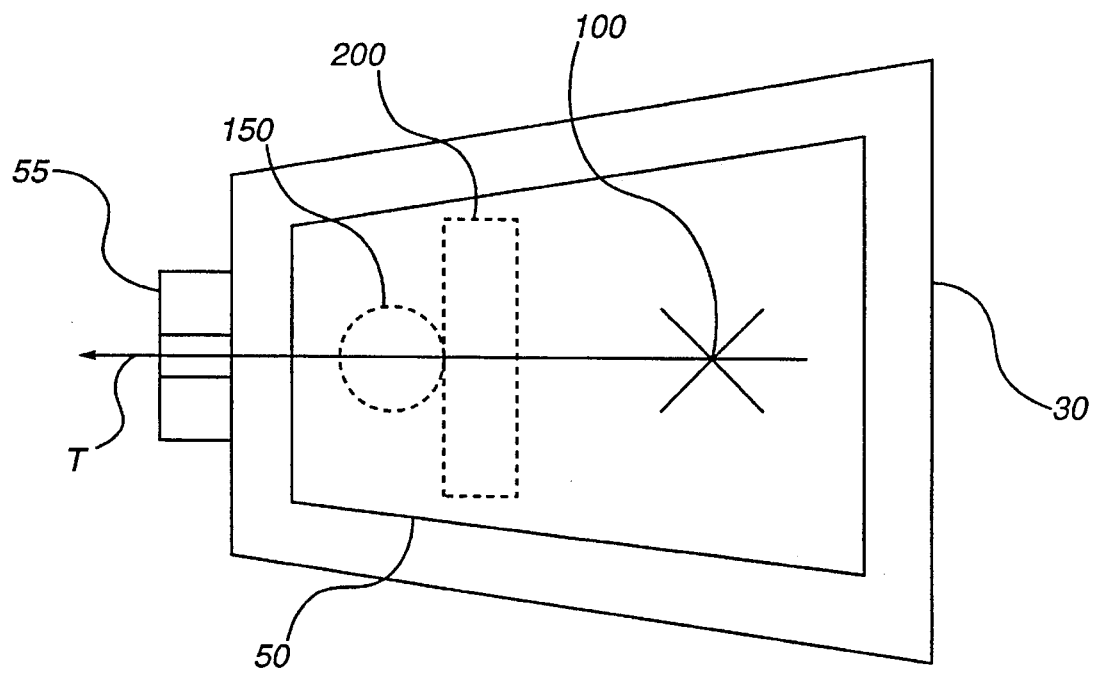
FIG. 5A illustrates a view out of the eye nearest the target of a golfer using the present device.
Figure 5B:
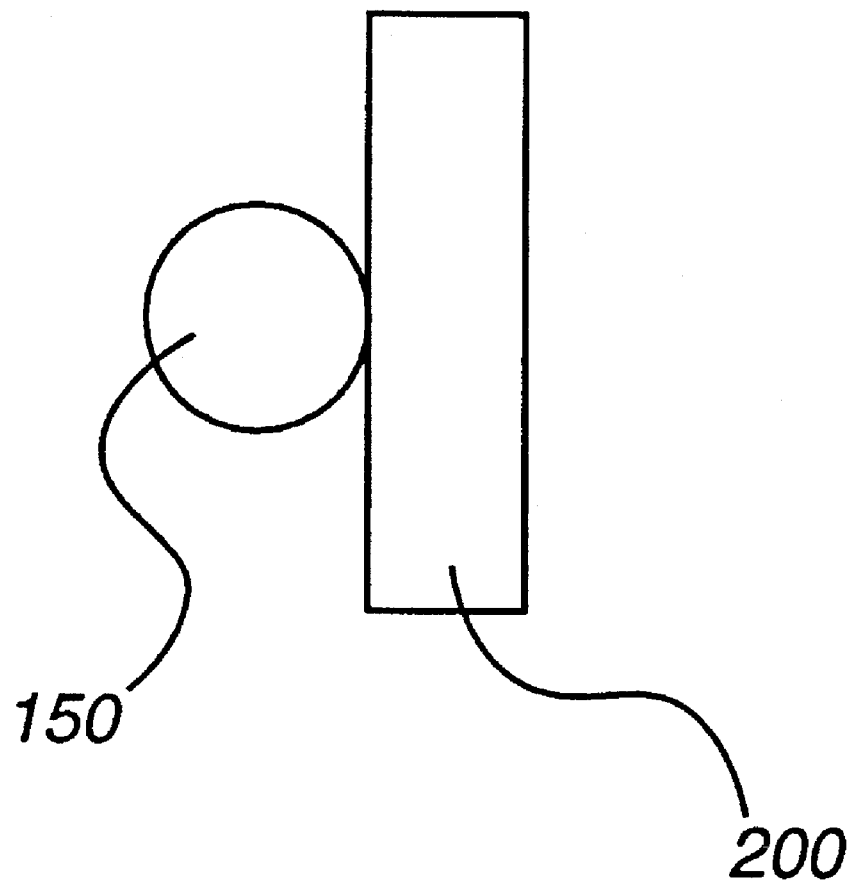
FIG. 5B illustrates a view out of the eye farthest from the target of a golfer using the present device.
Figure 5C:
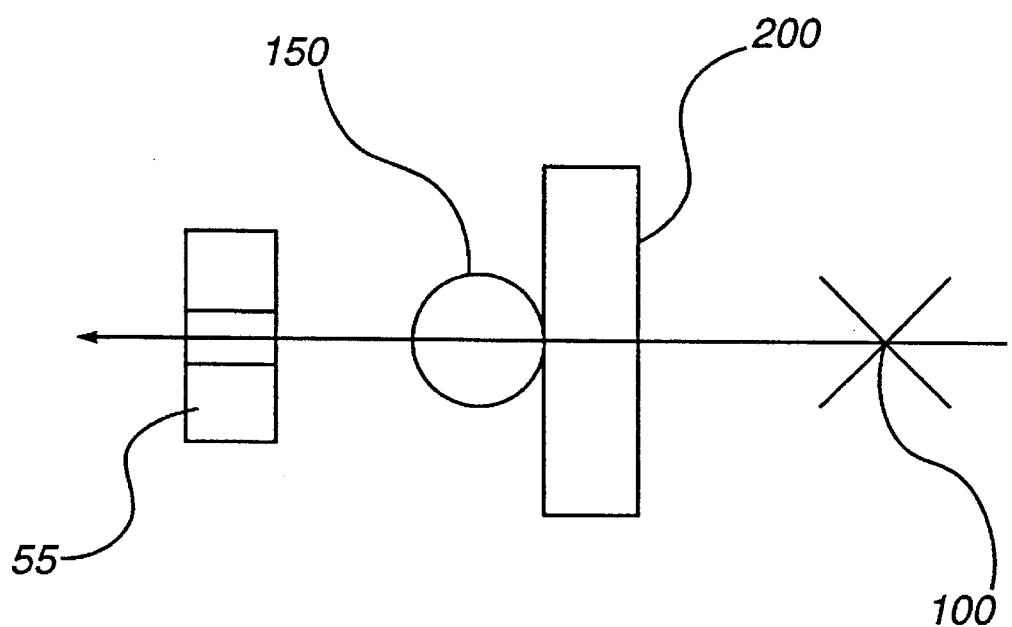
FIG. 5C illustrates the compound or composite view of a golfer using the present device.

The view seen by a golfer using device 10 is best illustrated in FIGS. 5A through 5C. FIG. 5A illustrates the view of the golfer when the eye nearest the target is open and the other eye closed. Putter 200 and ball 150 would not be visible, but are illustrated for reference in broken lines. FIG. 5B illustrates the unobstructed view of putter 200 and ball 150 as seen by the golfer with the eye farthest from the hole open and the other eye closed. FIG. 5C illustrates the "compound" view of the golfer when both eyes are opened. Target 100 appears in mirrored surface 50 which is not shown in FIG. 5C.

While maintaining the head steady, the golfer initiates the backswing and then brings the putter head through the ball on the target line indicated by mirrored surface 50. The present device thus provides a teaching aid to assist a golfer in achieving proper alignment during putting. Moreover, the present device also assists the golfer in maintaining the golfer's head steady during putting as any movement of the golfer's head is readily, visibly apparent from the motion of alignment member 30 with relative to the stationary ball.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A device for assisting a golfer in achieving proper alignment for a golf putting stroke in which a ball is struck to move towards a target, comprising:

a frame member to be worn by the golfer;

an alignment member adjustably attached to the frame member, the alignment member comprising a planar mirrored surface thereon, the position of the alignment member being adjustable to enable positioning of the mirrored surface such that a reflection of the target may be viewed by the eye of the golfer closest to the target; and eye alignment means for aligning the golfer's eyes to be substantially vertically over the ball and substantially in plane with the ball and the target, the eye alignment means providing an indication to the golfer of when the golfer's eyes are substantially vertically over the ball and substantially in plane with the ball and the target.

2. The device of claim 1 wherein the frame member comprises eye glass frames.

3. The device of claim 2 wherein the alignment member is hingedly attached to the frame member to enable positioning of the mirrored surface such that a reflection of the ball and the target may be viewed simultaneously by the eye of the golfer closest to the target.

4. The device of claim 1 wherein the eye alignment means comprising a level means positioned to indicate to the golfer if the golfer's eyes are substantially in plane with the ball and the target.

5. The device of claim 4 wherein the level means comprises a bubble level attached to a distal end of the alignment member, the bubble level being aligned with respect to the plane substantially perpendicular to a line between the ball and the target.

* * * * *